May 10, 1932.   F. M. EDGAR   1,857,683
REMOTE CONTROL LOCK STRUCTURE FOR VEHICLE DOORS
Filed Jan. 21, 1926   2 Sheets-Sheet 1
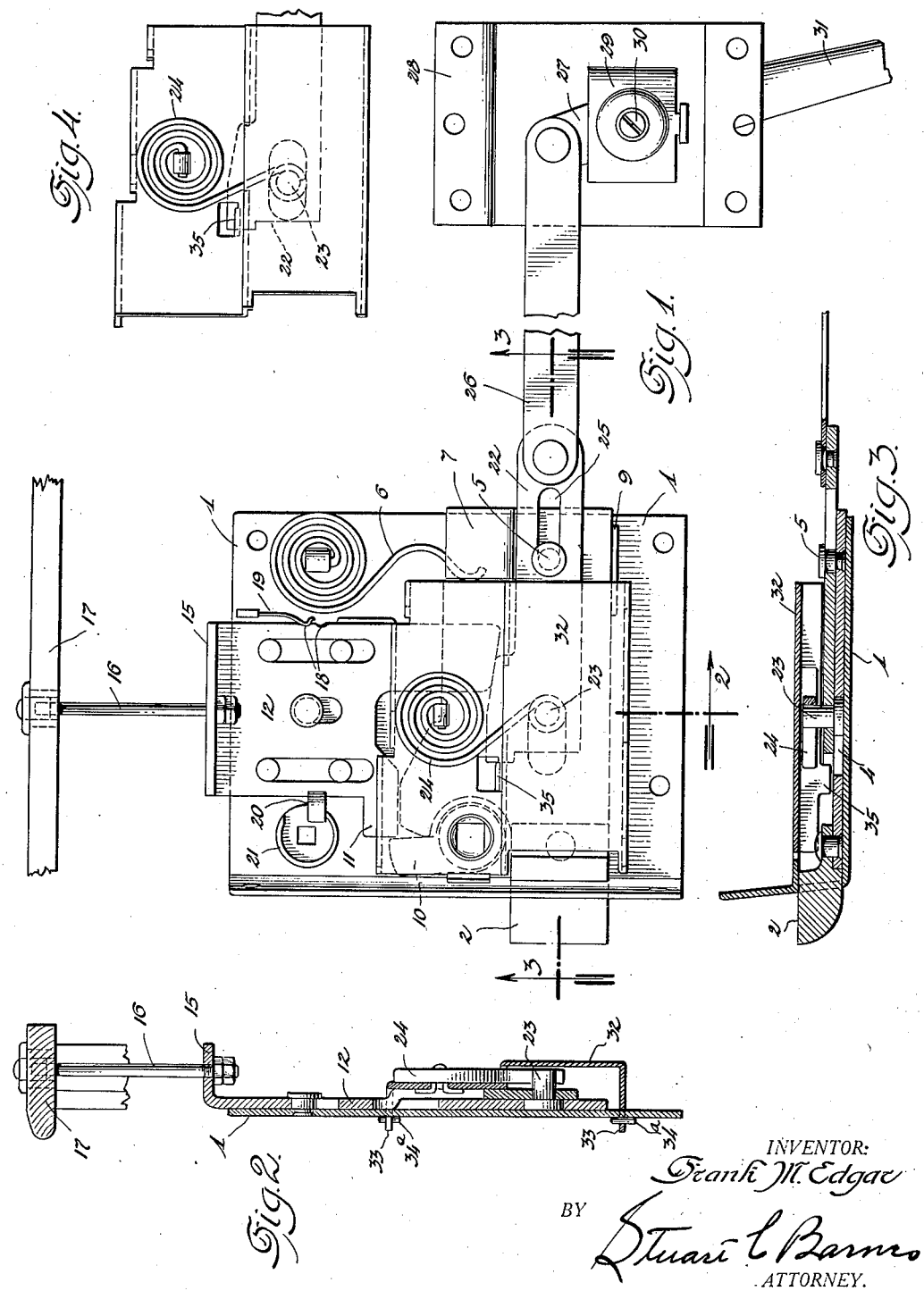
INVENTOR:
Frank M. Edgar
BY
Stuart C. Barnes
ATTORNEY.

May 10, 1932. F. M. EDGAR 1,857,683
REMOTE CONTROL LOCK STRUCTURE FOR VEHICLE DOORS
Filed Jan. 21, 1926 2 Sheets-Sheet 2
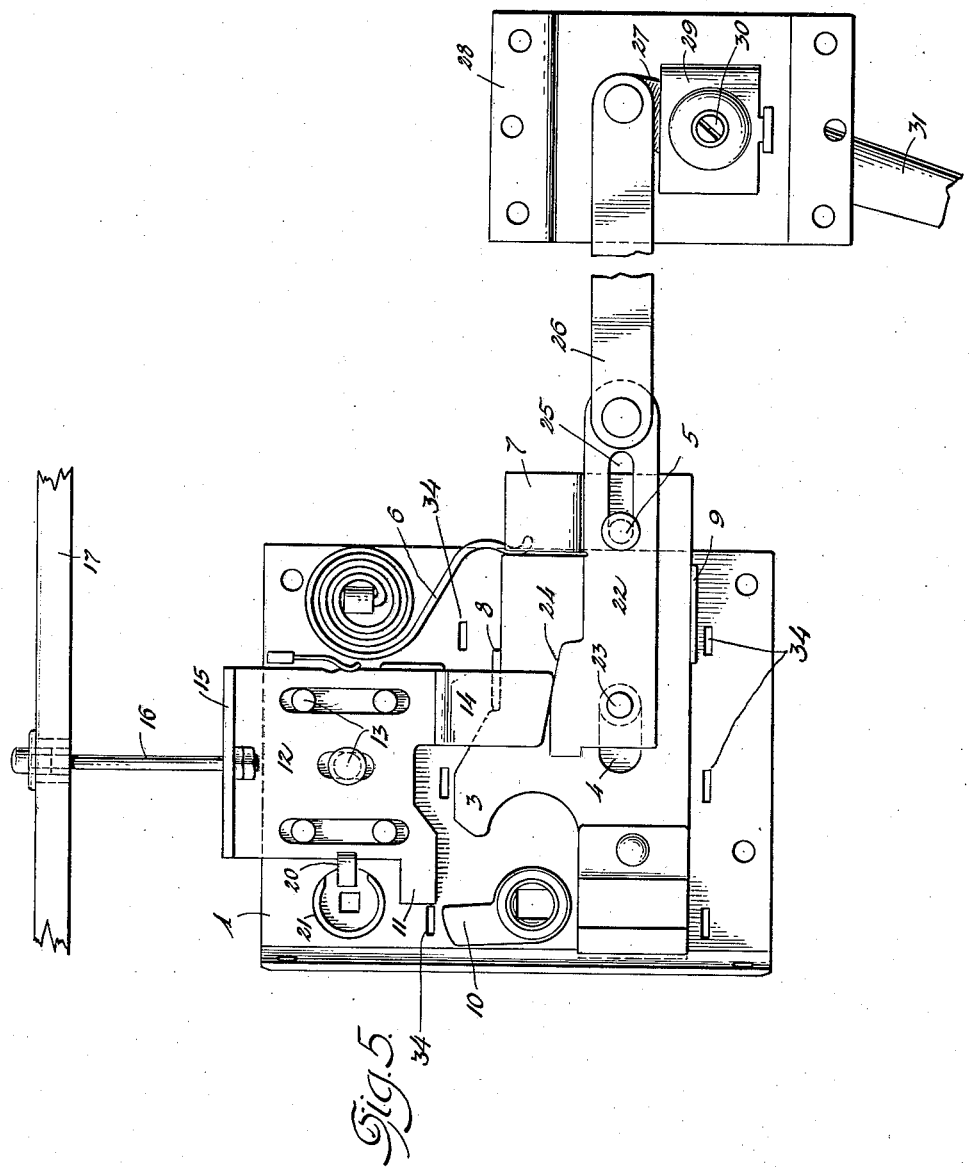
INVENTOR:
Frank M. Edgar
BY
Stuart C. Barnes
ATTORNEY.

Patented May 10, 1932

1,857,683

UNITED STATES PATENT OFFICE

FRANK M. EDGAR, OF DETROIT, MICHIGAN, ASSIGNOR TO TERNSTEDT MANUFACTURING COMPANY, OF DETROIT, MICHIGAN, A CORPORATION OF MICHIGAN

REMOTE CONTROL LOCK STRUCTURE FOR VEHICLE DOORS

Application filed January 21, 1926. Serial No. 82,659.

This invention relates to remote control lock structure for automobile doors, and has to do particularly with the provision of a novel type of locking structure of the class wherein the latching and dogging mechanism is controlled both from the inside and outside of the door.

The principal object of the present invention is to provide a remote control inside bolt retractor which is positioned in alignment with the bolt and which is designed to operate the latching device upon each actuation thereof.

Another object of this invention contemplates the provision of a combination remote control and pull-to handle, and a novel latching plate for locking the outside bolt retractor, said plate and remote control structure having co-operating cam surfaces.

A still further object of the present invention has to do with the provision of a latching means for the outside bolt retractor, which means may be moved into locking position from one remote point inside the automobile, and which means may be moved out of locking position from a second point within the automobile and remote from said other point.

Another object of the present invention is the provision of a novel bolt structure, locking means for controlling the operation of the bolt and inside retracting means for controlling both the bolt and locking means, all of such structures being so arranged and inter-connected so as to have a co-operating relation with each other in a novel manner and at the same time present an extremely compact and simple latch unit.

Still another object of this invention contemplates a novel method of assemblage of the locking bolt remote control retractor, the spring for controlling the same and the lock housing for enclosing a part of such structures.

Various other features of this invention will be apparent as this description progresses and will be brought out in the claims appended hereto. The various objects of my invention are preferably obtained by the structure illustrated in the drawings, wherein similar characters of references designate corresponding parts, and wherein;

Fig. 1 is a side elevation of the novel latch structure forming a part of this invention and also showing the novel control for the locking means and the combination remote control and pull-to handle.

Fig. 2 is a vertical cross section taken on line 2—2 of Fig. 1 and showing in detail the manner of connecting the operating parts to the latch casing and the preferred manner of operating the locking means by a pin protruding through the garnish moulding.

Fig. 3 is a horizontal cross section taken on line 3—3 of Fig. 1.

Fig. 4 is a fragmentary side elevation similar to Fig. 1 and showing the inside retractor and the latch housing in position just prior to the assembly of such parts.

Fig. 5 is a side elevation similar to Fig. 1 showing the manner of raising the locking means by actuation of the inside bolt retractor.

In the drawings the novel latch unit for an automobile door is shown as broadly comprising two separate fixtures, that is a locking bolt fixture or unit, and a remote control fixture which is designed to be operatable from the inside of the car and which serves as a remote control and a pull-to unit. The latch fixture comprises a substantially standard casing 1 which indirectly slidably supports a sliding bolt 2. This sliding bolt projects out of the casing in usual manner as is shown in Figs. 1 and 3, but the rear part of the bolt is relatively thin and wide and formed with an upwardly projecting lug 3. The central part of this flat rearward extension of bolt 2 is provided with an elongated aperture 4 and upset pin 5 for guiding and retaining the inside retracting bar to be presently described.

The bolt 2 is normally maintained in its forward projected position by means of a coil spring 6 secured to the casing 1. The thin flat part of the bolt 2 has a laterally struck-up portion at the upper rearward corner thereof, as shown at 7 in Figs. 1 and 5, for the purpose of forming a keeper for the end of the coil spring 6. The rearward part of the bolt 2 is slidably supported by lugs 8 and 9 which are formed of inwardly struck-up portions of the casing 1.

The upper extension 3 of the bolt 2 is designed to be actuated by roll-back 10, which is in turn designed to be actuated by an outside retractor in customary manner. This roll-back 10 is designed to be dogged, to prevent turning thereof by the outside retractor, by a lateral projection or extension 11 of a vertically slidable locking plate 12. This locking plate 12 is designed to be slidaby supported and guided by means of the suitable pins 13, secured to the latch casing 1. This locking plate is also provided with a downwardly extending projection 14 which is inwardly offset, as shown in Fig. 2 thereby forming a retaining means for the bolt 2. The lower end of this offset portion 14 is rearwardly tapered to form a cam surface adapted to be contacted by the retracting bar of the remote control fixture. The upper end of this lock plate 12 is preferably bent inwardly as at 15 to form a ledge for receiving the lower end of an operating pin 16. This pin or rod 16 preferably extends upwardly through a suitable mounting in the garnish moulding 17 of the automobile door. One side of this plate 12 is provided with notches 18 for receiving the end of a spring 19 suitably secured to the latch casing. It will be obvious that the plate 12 will be held in either its upward releasing position or lower locking position by the spring 19 fitting in one or other of the recesses 18. The opposite side of plate 12 is provided with the extension 20 which is designed to be embraced by the ends of an interrupted annular ring 21 forming a part of a suitable pin tumbler lock. This annular ring is preferably cut away as shown in Figs. 1 and 5 to provide a lost motion space for extension 20. Thus the plate 12 may be moved upwardly by the inside retractor bar, or downwardly by the pin 16 without turning such pin tumbler.

The latch bolt is adapted to be retracted from the inside of the automobile by a plate 22. This plate 22 is provided at its forward end with a pin 23, which pin preferably extends laterally on both sides of the plate. The portion of the pin extending inwardly of the plate is upset as shown in Fig. 3 so as to be guided in the slot 4 of the bolt 2. The other projection of the pin 23 is designed to be engaged by coil spring 24 to be presently described. The upper and forward end of this plate 22 is provided with a tapering cam surface 24 which is designed to contact with the cam surface of the plate 12. It will be obvious that when the plate 22 is moved rearwardly that the cam surface 24 will act upon the cam surface of plate 12 to raise the plate out of locking position. The rear central portion of the plate 22 is provided with an elongated slot 25 for receiving an upset pin 5.

Pivotally secured to this plate 22 is a bar 26 which forms the connecting means between the actuating plate 22 and the actuator arm 27 of the remote control fixture. This remote control fixture includes a plate 28 having secured thereto a housing 29, which is substantially U-shaped in cross section and is secured to the plate 28 in spaced relation therewith. This housing and plate are provided with a stud 30 rotatably supported therein, the actuator lever 27 being secured to one end of this stud and the combined latch operating and pull-to handle 31 being secured to the other end of said stud.

The spring 24 which is designed to contact with the pin 23 of the inside bolt retractor is preferably carried by a housing element 32. This housing element is of general U-shape in cross section, the edges forming the U being provided with suitable lugs 33 which are designed to enter suitable openings 34 in the latch casing. Such housing is held in place by means of pins 34 which are driven through suitable apertures in the lugs 33. The surface of this housing 32 is offset as best shown in Fig. 2, and the body of the coil spring 24 is mounted upon the inwardly offset portion of the housing. The downwardly extending portion of the coil spring 24 protrudes through a suitable slot in the housing 32, as shown in Fig. 2, and such spring is, when the parts are assembled, designed to engage the pin 23 and hold the inside retractor unit in a fixed non-rattling position.

As best shown in Figs. 1 and 3, the housing plate 32 is provided with an inwardly struck-up portion 35 which serves as a stop for the retractor plate 22 and also holds the plate 22 and pin 23 in such position as to maintain the spring 24 under tension. When the inside retracting unit is held in its normal non-rattling position the actuating lever 27 is designed to be pressed against one side of the remote control housing 29, to assist in preventing the remote control unit from rattling. It will also be understood that an additional spring may be imposed between the slotted stud 30 and a fixed lug on the base of the housing 29 which spring will tend to hold the lever 27 in its counter clockwise position, and which additional spring could be used either to take the place of, or assist, the coil spring 24.

Prior to assembling the housing 32 it will be obvious that the lower end of the spring 24 will be in the position shown in Fig. 4. In order to cause the lower end of such spring to engage the pin 23 in the proper manner to provide the necessary resilience a novel method of assemblage is made use of. The retractor plate 22 is first moved inwardly, as shown in Fig. 4, to such a position that when the housing 32 is positioned so that the lugs 33 engage the slots 34 the coil spring 24 will engage the back of the pin 23. In this position of the housing it will be obvious, as shown in Fig. 4, that the lug or stop 35 will abut against the plate 22 so that the housing 32 cannot be pushed completely inwardly to its normal position against the casing. The retractor plate 22 is then moved rearwardly, at the same time moving the end of the spring 24 to the right, until the end of the plate 22 uncovers the lug or stop 35. At this point the housing 32 may be pushed "home" whereby it can be secured into place by the pins 34. Thus by this simple method of assemblage the retractor plate 22 is moved to and held in normal non-rattling position as shown in Fig. 1 and the spring 24 is displaced so as to resiliently engage the pin 23. It will be obvious that the function of the lug 35 and the method of assembling just described may be applied to the bolt 2 when a retractor different than that disclosed herein is utilized. In such a case the bolt 2 which initially should be in a position extending to a position beyond that shown in Fig. 1 and by pushing the bolt slightly inwardly to retract the spring the housing could be pushed into place to thus keep the bolt in a normal extended position and at the same time render the spring effective to resiliently maintain the bolt in such position. In this latter case it will be obvious that the spring 24 could be utilized in place of the spring 6 for keeping the bolt in extended position.

It will thus be seen that I have provided a novel and extremely compact latch structure for automobile doors wherein a person sitting remote from the latch fixture may by merely grabbing hold of the pull-to handle either disengage the dogging unit to permit a person to enter from the outside, or may turn the pull-to handle to retract the bolt and open the door. It will further be obvious by my novel structure and arrangement that a person sitting adjacent the latch fixture may by merely pressing down on the pin 16 force the locking dog into locking position to prevent the entrance of a person from the outside except by means of a key to rotate the pin tumbler lock 21.

Having thus described my invention, what I claim is:

1. In a lock assembly, the combination of a slidable bolt, an outside operated roll-back for retracting said bolt, a vertically movable plate adapted to contact with said roll-back for locking same against movement, an extension on said plate having a lost motion engagement with a member adapted to be connected with a pin tumbler lock whereby the plate can be moved, and means connected to said plate and extending up through the garnish moulding of the door, to move the plate within the limits of said last motion into locking position without exerting turning effort on the member.

2. In a latch assembly, the combination of a slidable bolt, means operatable from the outside of the door for retracting said bolt and means movable to one position for locking said retracting means, said means being provided with an extension for overlapping and guiding said bolt.

3. In a latch assembly, the combination of a slidable bolt, means operatable from the outside of the door for retracting said bolt, a vertically reciprocable plate for locking said outside retractor and provided with an extension having a cam surface and a reciprocable means operated from the inside of the door and provided with a cam surface engaging the cam surface of said locking plate for raising and releasing the same from locking position.

4. In a latch assembly, the combination of a slidable bolt, said bolt having a rearward extension mounted within the lock casing, a spring for projecting said bolt, and a plate slidably mounted on said rearward extension for retracting the bolt, said rearward bolt extension being struck up to form a keeper for the end of said spring.

5. In a latch assembly, a combination of a slidable bolt, reciprocable means operatable from the inside of the door for preventing the retraction of the bolt from the outside and reciprocable means movable at right angles to said first named means and operatable from the inside of the door for moving said locking means to inoperative position.

6. In a remote control latch, the combination of a latch unit, a slidable bolt, a retracting plate actuated by a remote control unit positioned in alignment with said bolt, a housing enclosing said bolt and retracting plate and a spring mounted on the outside of said housing and extending through a slot of said housing for engaging said retracting plate for resiliently maintaining the same in non-rattling position.

7. In a remote control latch, of the type having a latch unit, and a remote control unit, the combination of a slidable bolt, a plate slidable relative to said bolt adapted to retract the same and spring means mounted on said latch unit for holding said plate and said remote control means at the limit of movement to prevent rattling thereof.

8. In a remote control latch, the combination of a latch unit, a slidable bolt, a reciprocable means movable into one position to lock the bolt against retraction from the outside of the door, said means being provided with a downward extension overlapping said bolt, means remotely controlled from the inside of the door for simultaneously retracting the bolt and engaging with said downward extension to release said locking means and means controllable from the inside of the door for moving said locking means into locking position.

9. In a latch assembly, the combination of a latch unit comprising a slidable bolt, an inside operated retractor plate slidable relative to said bolt, a housing provided with a stop for limiting the inward movement of said plate, a spring for holding the plate against said housing stop and a remote control unit connected to said retracting plate.

10. In a latch assembly, of the type having a reciprocating latch unit, a slidable bolt, an inside operated retractor plate slidable relative to said bolt, a housing provided with a stop for limiting the inward movement of said plate, a spring for holding the plate against said stop, and a series of apertures in the main latch housing for receiving said first mentioned housing, said first mentioned housing being positionable adjacent the main housing whereby the spring will abut a portion of said plate when a portion of said plate is beneath said stop, said plate being reciprocable whereby to flex said spring and to permit said first named housing and said stop to be forced into position.

In testimony whereof I have affixed my signature.

FRANK M. EDGAR.